US005579722A

United States Patent [19]

Yamamoto et al.

[11] Patent Number: 5,579,722

[45] Date of Patent: Dec. 3, 1996

[54] ABSORBENT COMPOSITE PANEL FOR PET ANIMAL

[75] Inventors: Masamitsu Yamamoto, Kawanoe; Noriyuki Kimura, Iyomishima; Kengo Ochi, Kawanoe, all of Japan

[73] Assignee: Uni-Charm Corporation, Ehime-ken, Japan

[21] Appl. No.: 498,957

[22] Filed: Jul. 6, 1995

[30] Foreign Application Priority Data

Jul. 6, 1994 [JP] Japan .................................... 6-154462

[51] Int. Cl.$^{6}$ ..................................................... A01K 1/015

[52] U.S. Cl. ............................................... 119/169; 428/72

[58] Field of Search .................................... 119/28.5, 165, 119/169; 44/531, 532, 534; 428/43, 72, 166, 168, 178, 198

[56] References Cited

U.S. PATENT DOCUMENTS

| | | | |
|---|---|---|---|
| 2,633,442 | 3/1953 | Caldwell | 428/72 X |
| 3,284,273 | 11/1966 | Prentice | 119/169 X |
| 4,250,834 | 2/1981 | Cheselka | 119/169 |
| 4,289,513 | 9/1981 | Brownhill et al. | 428/166 X |
| 4,485,584 | 12/1984 | Raulerson et al. | 44/531 |
| 4,555,433 | 11/1985 | Jablonka et al. | 428/166 |
| 4,910,060 | 3/1990 | Nakanishi | 428/72 |

FOREIGN PATENT DOCUMENTS 4-673 1/1992 Japan .

*Primary Examiner*—Robert P. Swiater
*Assistant Examiner*—Elizabeth Shaw
*Attorney, Agent, or Firm*—Lowe, Price, LeBlanc & Becker

[57] ABSTRACT

The present invention discloses an absorbent composite panel to be laid on a urination tray for pet animals such as cats and dogs, the composite panel comprising a liquid-permeable topsheet, a liquid-impermeable backsheet and a liquid-absorbent core disposed between these two sheets, the absorbent core comprising a plurality of core elements intermittently arranged independently of one another and the top- and backsheets being bonded together over zones defined between each pair of adjacent core elements so that a selected portion of the composite panel may be cut off from the remainder.

4 Claims, 3 Drawing Sheets

1
2
3
4
4
6
7
d
d

ABSORBENT COMPOSITE PANEL FOR PET ANIMAL

BACKGROUND OF THE INVENTION

The present invention relates to an absorbent composite panel and, more particularly, to an absorbent composite panel to be laid on a urination or evacuation tray and the like used to breed pet animals such as cats and dogs.

Conventional absorbent composite panels for pet animals generally comprise a liquid-permeable sheet, a liquid-impermeable sheet and a liquid-absorbent core disposed between these two sheets, as disclosed, for example, in the Japanese Utility Model Application publication No. Hei 4-673.

With the known absorbent composite panel, even when the composite panel is only partially smeared with urine, the composite panel must be entirely exchanged with a new one in order to keep a breeding environment clear. Thus, a pet owner is uneconomically burdened with a considerable cost. If the portion of the composite panel smeared with urine is cut off and thrown away, a part of the liquid-absorbent core will run out through the cut opening and the absorbent composite panel will no longer be effective for its proper purpose. Furthermore, absorbent composite panel often fails to prevent a partial quantity of urine from overflowing beyond the periphery of the composite panel when the quantity a urination expelled at one time is relatively large or when urination takes place adjacent the periphery of the composite panel.

In view of such inconveniences unsolved by the prior art, it is a principal object of the invention to solve these inconveniences by forming a liquid-absorbent core from a plurality of core elements intermittently arranged independently of one another.

SUMMARY OF THE INVENTION

The object set forth above is achieved, according to the invention, by an absorbent composite panel comprising a liquid-permeable topsheet, a liquid-impermeable backsheet and a liquid-absorbent core disposed between these two sheets, the liquid-absorbent core comprising a plurality of core elements intermittently arranged independently of one another in a prescribed pattern and the top- and backsheets being bonded to one another along peripheries of the respective core elements so that a selected portion of the absorbent composite panel may be cut off from the remainder along the peripheries of the core elements.

Preferably, the core elements are placed in alignment with one another on the backsheet so as to define at least one side edge of the absorbent composite panel; and a portion of at least the backsheet extending outward beyond the side edge of the absorbent composite panel is bent upward along the side edge and bonded to the topsheet so as to form a barrier against urine leakage.

Preferably, the core elements are enveloped in hollow zones of the topsheet formed in cube, rectangular parallelepipedon, trapezoid or semisphere pattern.

The absorbent composite panel of the invention constructed as described above allows only the portion thereof smeared with urine to be thrown away by cutting off the top- and backsheet sections associated with this smeared portion along the respective bonding zones between each pair of adjacent core elements, since the composite panel is adapted to absorb urine by the individual core elements. Furthermore, along at least one side edge of the absorbent composite panel, the liquid-impermeable backsheet forms the barrier serving to dam up the flow of urine even when the quantity of urination expelled at one time is relatively large.

PREFERRED EMBODIMENTS OF THE INVENTION

Figure 1:
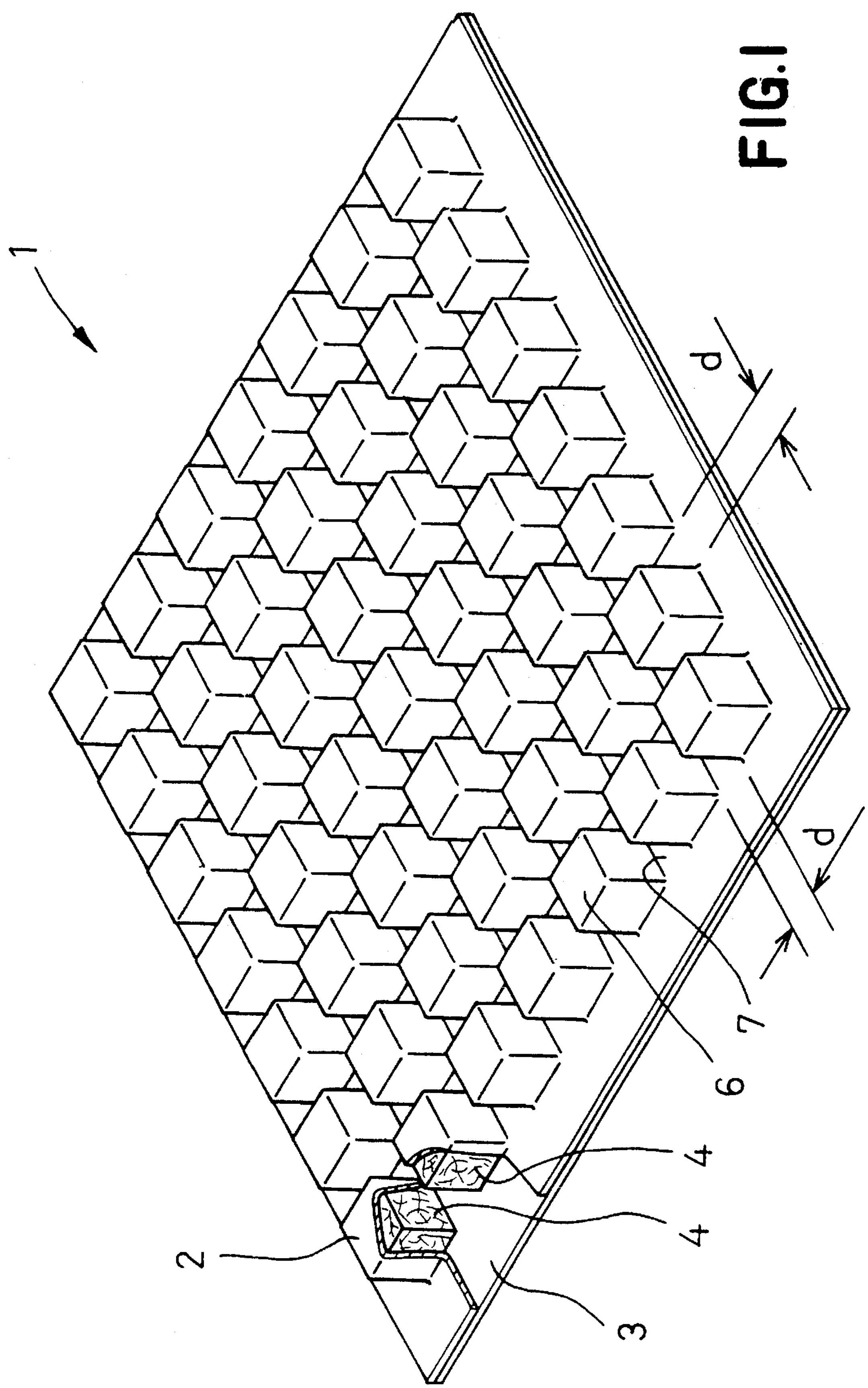
FIG. 1 is a perspective view showing an embodiment of an absorbent composite panel according to the invention as partially broken away.

Referring to FIG. 1, an absorbent composite panel 1 comprises a liquid-permeable topsheet 2, a liquid-impermeable backsheet 3 and a plurality of liquid-absorbent core elements 4 disposed between these two sheets 2, 3. Each of the liquid-absorbent core elements 4 is made of well-known materials selected from a group including pulp, bentonite, carboxymethyl cellulose, hydrophilic fibers, fine pieces of tissue paper, fluff pulp or the like and water-absorbent polymer powders, or a mixture thereof, the materials being suitably shaped, for example, in cube, rectangular parallelepipedon, trapezoid or semisphere, and crosswise arranged at a desired distance between each pair of adjacent core elements 4. In the specific embodiment illustrated, the core elements 4 each comprising a cube having each side of 5 to 50 mm are crosswise arranged at a distance "d" of20 to 40 mm between each pair of adjacent core elements 4. The topsheet 2 comprises a thermoformed liquid-permeable sheet such as a nonwoven fabric of thermoplastic synthetic fibers or such synthetic fibers mixed with natural fibers or a mesh sheet of thermoplastic material and configurated so as to have receptacle zones 6 allowing the individual core elements 4 to be arranged in a cubic pattern and flat base zones 7 extending between each pair of adjacent absorbing zones 6. Each of the receptacle zones 6 is slightly larger than the core elements 4 and each of the base zones 7 has a width substantially corresponding to the distance "d"between each pair of adjacent core elements 4. The backsheet 3 is made of a thermoplastic film, a water-proof paper or the like having an appropriate thickness and integrally bonded to the topsheet 2 over the base zones 7 thereof by means of heat sealing or adhesive. Zones of the topsheet 2 over which the backsheet 3 is integrally bonded to the topsheet 2 are liquid-impermeable and function to prevent a quantity of urine which has been absorbed by the core element(s) from being guided through the base zones 7 into the adjacent core elements 4. The base zone 7 can be cut with scissors or hands longitudinally thereof, facilitating it to throw away only the core element(s) smeared with urine or to trim the absorbent composite panel 1 in accordance with a size or configuration of a urination tray.

Figure 2:
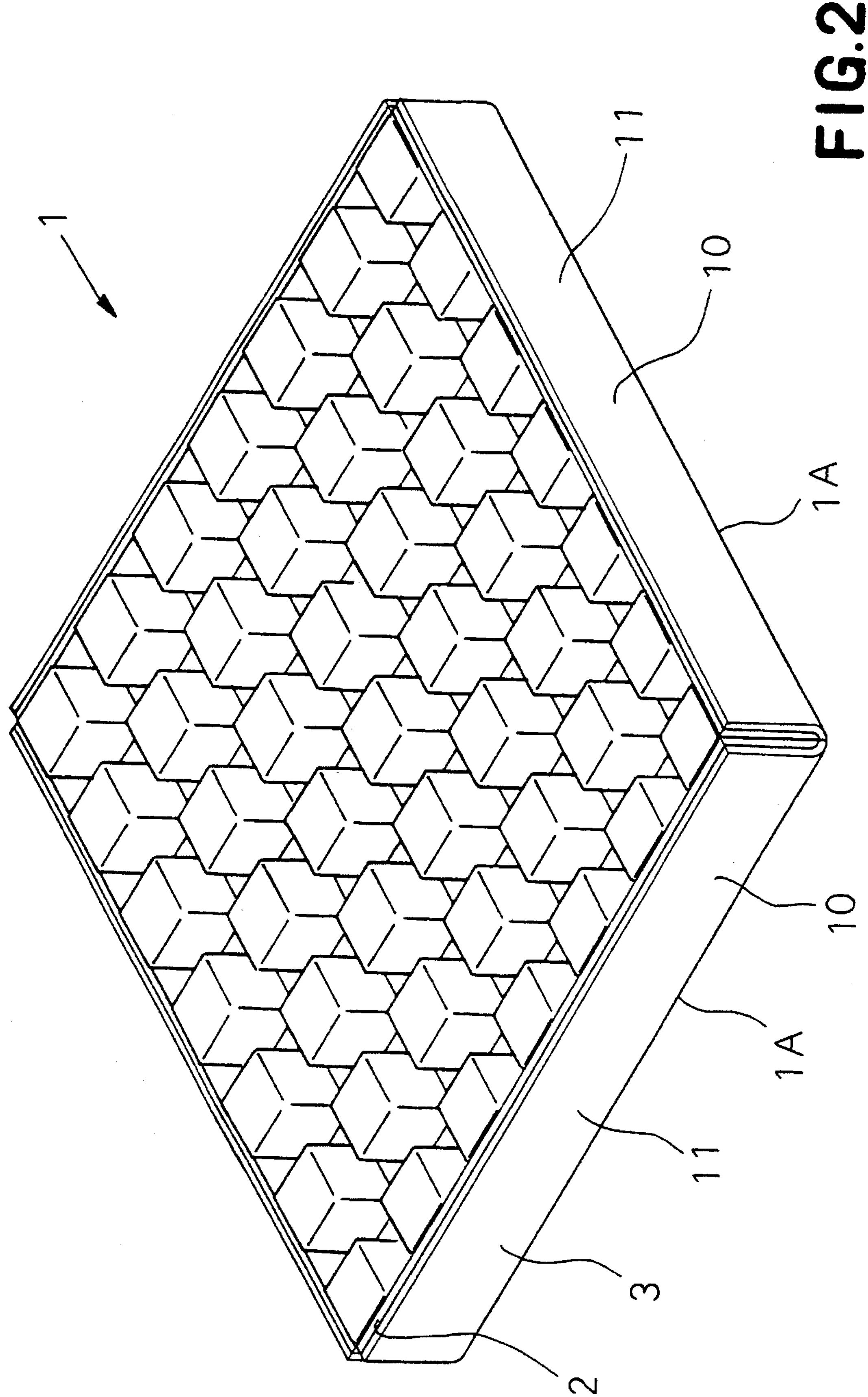
FIG. 2 is a perspective view showing a variant of the absorbent composite panel shown by FIG. 1.

Referring to FIG. 2, side edges 1A of the composite panel 1 are defined by the respective outermost rows of the core elements 4 arranged in alignment with one another and portions of the top- and backsheets 2, 3 extending outward beyond the side edges 1A are bonded together to form peripheral edges 10 of the composite panel 1. The peripheral edges 10 formed in this manner is bent upward by an angle of 90° with the topsheet 2 facing inwardly and bonded to the side walls of the absorbing zones 6 in the respective outermost rows of the topsheet 2 so as to form barriers 11 against urine leakage. The barriers 11 are to prevent the flow of urine from occurring between each pair of adjacent core elements 4. The outer layers of these barriers 11 are defined by the liquid-impermeable backsheet 3 and therefore exudation of urine through these outer layers is reliably avoided.

Figure 3:
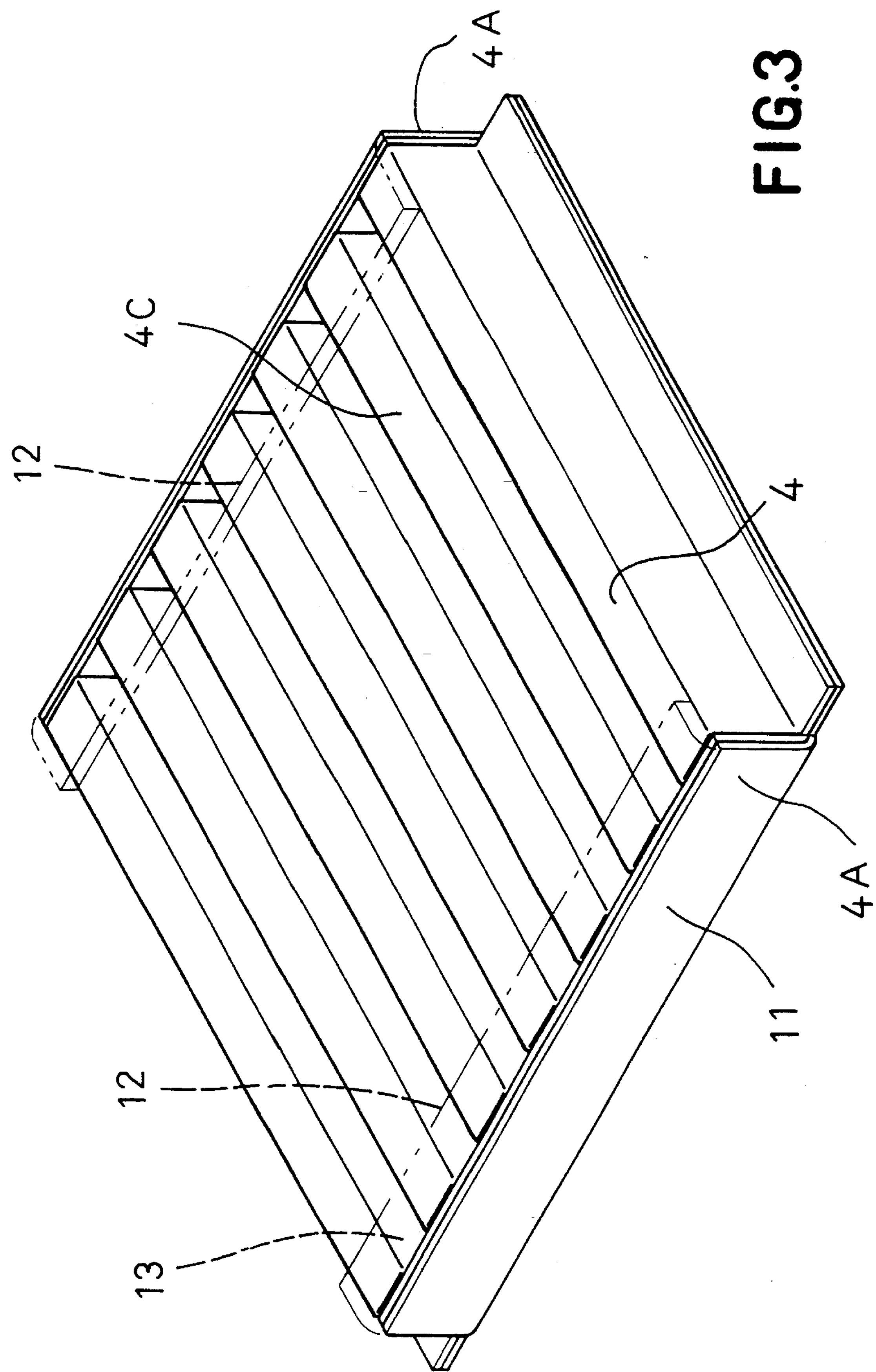
FIG. 3 is a perspective view showing still another variant of the absorbent composite panel shown by FIG. 1.

Referring to FIG. 3, the composite panel 1 includes a plurality of core elements 4 in the form of rectangular parallelepipedons arranged in parallel to one another and the outermost core elements 4 function as the barriers. As shown, the composite panel 1 has a pair of barriers 11 along only one pair of opposite ends 4A. The composite panel 1 may be cut off along a region between each pair of adjacent core elements 4 to assure that the remainder of the composite panel 1 can be always confined between the barrier 11 and the outermost core elements 4 and thereby urine leakage can be reliably avoided. It is also possible in this specific embodiment of the composite panel 1 to dimension a height of the barrier 11 so that upper surfaces 4C of the outermost core elements 4 may be partially covered by upper edges 13 of the barrier bent inward and bonded to the upper surfaces 4C. Such arrangement is effective to prevent the composite panel 1 from being bent between each pair of adjacent core elements 4 and, in addition, makes the composite panel 1 handy to carry.

With the absorbent composite panel of the invention, the absorbent composite panel can be easily trimmed so as to be laid on the urination tray in conformity to a size or configuration of the latter, since the liquid-absorbent core comprises a plurality of core elements intermittently arranged independently of one another and the top- and backsheets are bonded together over the flat zones defined between each pair of adjacent core elements so that a selected portion of the composite panel may be cut off from the remainder along the flat zones. Additionally, the absorbent composite panel allows only the portion smeared with urine to be cut off and thereby allows the composite panel to be kept clean without burdening a pet owner with a high cost.

Provision of the barrier against urine leakage along the peripheral edge of the absorbent composite panel eliminates an apprehension that a quantity of urine discharged on the core element(s) lying adjacent the peripheral edge might overflow beyond the peripheral edge and smear an area of the floor around the urination tray.

What is claimed is:

1. An absorbent composite panel comprising:

a liquid-permeable topsheet;

a liquid-impermeable backsheet;

a liquid-absorbent core disposed between these two sheets;

said liquid-absorbent core comprising a plurality of core elements intermittently arranged independently of one another in a prescribed pattern; and said top- and backsheets being bonded to one another along peripheries of each said core elements so that a selected portion of said composite panel may be cut off from the remainder along said peripheries.

2. An absorbent composite panel according to claim 1, wherein said core elements are placed in alignment with one another on said backsheet so as to define at least one side edge of said composite panel; and wherein a portion of at least said backsheet extending outward beyond said side edge is bent upward along said side edge and bonded to said topsheet covering said core so as to form a barrier against urine leakage.

3. An absorbent composite panel according to claim 1, wherein said core elements are enveloped in hollow zones of said topsheet formed in at least one of a cube, rectangular parallelepipedon, trapezoid or semisphere pattern.

4. An absorbent composite panel according to claim 1, wherein said absorbent core elements are made of materials selected from a group including bentonite, carboxymethyl cellulose, hydrophilic fibers, fine pieces of tissue paper, fluff pulp and water-absorbent polymer powders or a mixture thereof.

* * * * *